(12) United States Patent
Chang et al.

(10) Patent No.: US 12,475,879 B2
(45) Date of Patent: Nov. 18, 2025

(54) METHOD AND APPARATUS FOR GENERATING A SPEECH RECOGNITION MODEL FOR GENERATING AN E2E SPEECH RECOGNITION MODEL USING CALIBRATION CORRECTION

(71) Applicant: Industry-University Cooperation Foundation Hanyang University, Seoul (KR)

(72) Inventors: Joon-Hyuk Chang, Seoul (KR); Mun hak Lee, Seoul (KR)

(73) Assignee: Industry-University Cooperation Foundation Hanyang University, Seoul (KR)

( * ) Notice: Subject to any disclaimer, the term of this patent is extended or adjusted under 35 U.S.C. 154(b) by 418 days.

(21) Appl. No.: 18/082,767

(22) Filed: Dec. 16, 2022

(65) Prior Publication Data
US 2023/0206901 A1  Jun. 29, 2023

(30) Foreign Application Priority Data
Dec. 23, 2021  (KR) .................. 10-2021-0185933

(51) Int. Cl.
*G10L 15/16* (2006.01)
*G10L 15/01* (2013.01)
(Continued)

(52) U.S. Cl.
CPC ............ *G10L 15/01* (2013.01); *G10L 15/063* (2013.01); *G10L 15/16* (2013.01); *G10L 15/197* (2013.01)

(58) Field of Classification Search
CPC .................................................. G10L 15/01
(Continued)

(56) References Cited

U.S. PATENT DOCUMENTS

| | | | | |
|---|---|---|---|---|
| 5,729,694 A | * | 3/1998 | Holzrichter | G06Q 20/204 |
| | | | | 704/E15.041 |
| 2017/0123487 A1 | * | 5/2017 | Hazra | G06F 3/0482 |

(Continued)

FOREIGN PATENT DOCUMENTS

| | | | | |
|---|---|---|---|---|
| KR | 10-1871604 B1 | | 6/2018 | |
| KR | 10-1988504 B1 | | 10/2019 | |
| KR | 20230096450 A | * | 6/2023 | ........... G10L 15/183 |

OTHER PUBLICATIONS

Q. Liu, Z. Chen, H. Li, M. Huang, Y. Lu and K. Yu, "Modular End-to-End Automatic Speech Recognition Framework for Acoustic-to-Word Model," in IEEE/ACM Transactions on Audio, Speech, and Language Processing, vol. 28, pp. 2174-2183, 2020, doi: 10.1109/TASLP.2020.3009477. keywords: {Hidden Markov models (Year: 2020).*

Q. Liu, Z. Chen, H. Li, M. Huang, Y. Lu and K. Yu, "Modular End-to-End Automatic Speech Recognition Framework for Acoustic-to-Word Model," in IEEE/ACM Transactions on Audio, Speech, and Language Processing, vol. 28, pp. 2174-2183, 2020, doi: 10.1109/TASLP.2020.3009477. keywords: {Hidden Markov model— (Year: 2020).*

(Continued)

*Primary Examiner* — Bharatkumar S Shah
(74) *Attorney, Agent, or Firm* — Sughrue Mion, PLLC (57) ABSTRACT

A speech recognition model generating device for generating an E2E speech recognition model using calibration correction comprising an acoustic model including a first artificial neural network module using a speech information as input information and using a first text information corresponding to the speech information as output information, a language model comprising a second artificial neural network module using the first text information as input information and outputting a second text information corresponding to the first text information as output information based on the characteristics of the language model, and a E2E speech model generating unit generating a coupling probability distribution based on a first probability distribution information of the acoustic model output by the acoustic (Continued)

model and a second probability distribution information of the language model output by the language model, and generating a E2E speech model based on the coupling probability distribution, wherein the E2E speech model generating unit is generating the E2E speech model based on the corrected acoustic model and the corrected language model after each calibration is performed on the acoustic model and the language model.

10 Claims, 7 Drawing Sheets

(51) Int. Cl.
  *G10L 15/06* (2013.01)
  *G10L 15/197* (2013.01)
(58) Field of Classification Search
  USPC .......................................................... 704/232
  See application file for complete search history.

(56) References Cited

U.S. PATENT DOCUMENTS

2019/0013013 A1* 1/2019 McLaren ................. G10L 15/10
2022/0269346 A1* 8/2022 Hussami ................. G06F 3/012

OTHER PUBLICATIONS

V. Huy Nguyen, "An End-to-End Model for Vietnamese Speech Recognition," 2019 IEEE-RIVF International Conference on Computing and Communication Technologies (RIVF), Danang, Vietnam, 2019, pp. 1-6, doi: 10.1109/RIVF.2019.8713758. keywords: {Hidden Markov models:Acoustics; Speech recognition;Neural netwo (Year: 2019).*

* cited by examiner

| | LibriSpeech train-clean-100 | | | | |
|---|---|---|---|---|---|
| | Cross Entropy | $ECE_{adaptive}$ | $ECE_1$ | $ECE_2$ | $ECE_3$ |
| Uncalibrated | 5.78E-05 | 5.66E-05 | 5.65E-05 | 2.63E-06 | 1.92E-07 |
| Label smoothing | 7.76E-02 | 7.19E-02 | 7.20E-02 | 3.86E-03 | 1.28E-03 |
| Temperature scaling | 1.82E-03 | 1.68E-03 | 1.67E-03 | 6.97E-04 | 1.70E-04 |
| Matrix scaling | 4.63E-03 | 4.13E-03 | 4.13E-03 | 2.03E-03 | 4.24E-04 |

| | LibriSpeech test-clean | | | | |
|---|---|---|---|---|---|
| | Cross Entropy | $ECE_{adaptive}$ | $ECE_1$ | $ECE_2$ | $ECE_3$ |
| Uncalibrated | 9.46E-01 | 5.97E-02 | 8.31E-02 | 2.50E-02 | 1.17E-02 |
| Label smoothing | 6.07E-01 | 6.08E-02 | 6.53E-02 | 1.89E-02 | 6.89E-03 |
| Temperature scaling | 5.59E-01 | 2.61E-02 | 3.20E-02 | 1.38E-02 | 7.26E-03 |
| Matrix scaling | 5.45E-01 | 2.52E-02 | 3.07E-02 | 1.27E-02 | 6.84E-03 |

| | LibriSpeech test-other | | | | |
|---|---|---|---|---|---|
| | Cross Entropy | $ECE_{adaptive}$ | $ECE_1$ | $ECE_2$ | $ECE_3$ |
| Uncalibrated | 1.56E+00 | 9.42E-02 | 1.43E-01 | 3.98E-02 | 1.90E-02 |
| Label smoothing | 1.09E+00 | 4.92E-02 | 5.39E-02 | 3.38E-02 | 1.43E-02 |
| Temperature scaling | 1.02E+00 | 3.98E-02 | 4.98E-02 | 2.29E-02 | 1.19E-02 |
| Matrix scaling | 9.71E-01 | 3.75E-02 | 4.79E-02 | 2.05E-02 | 1.16E-02 |

METHOD AND APPARATUS FOR GENERATING A SPEECH RECOGNITION MODEL FOR GENERATING AN E2E SPEECH RECOGNITION MODEL USING CALIBRATION CORRECTION

FIELD OF THE DISCLOSURE

This application claims priority from Korean Patent Application No. 10-2021-0185933, filed on Dec. 23, 2021 in the Korean Intellectual Property Office, the disclosure of which is incorporated herein by reference.

BACKGROUND

The present invention relates to an apparatus for generating a speech recognition model that generates an E2E speech recognition model by using calibration correction, and more particularly, in generating the E2E speech model including the acoustic model and the language model, it is an invention related to a technology for generating an E2E speech model with higher reliability and accuracy by reflecting the characteristics of an acoustic model and a language model.

Speech is the most natural means of communication for humans, a means of information transfer, and a meaningful sound made by humans as a means of implementing language.

As technology advances, research on realization of communication between humans and machines through speech continues. Moreover, as speech information technology (SIT) for effectively processing speech information has recently achieved remarkable development, it is being applied to real life.

When such speech information processing technologies are broadly classified, they may be classified into categories such as speech recognition, speech synthesis, speaker identification and verification, and speech coding.

Speech recognition is a technology that recognizes the spoken speech and converts it into a text. Speech synthesis is a technology that converts a text into an original speech using data or parameters obtained from speech analysis. Speaker identification and verification is a technology that estimates or authenticates speakers through spoken speech, and speech coding is a technology that effectively compresses and encodes speech signals.

Speech synthesis technology can be roughly divided into two types according to the actual application method. Restricted vocabulary synthesis that synthesizes only sentences with a limited number of words and syntactic structure, or Automatic Response System (ARS) and unlimited vocabulary synthesis that synthesizes speech by receiving arbitrary sentences or text-to-speech (TTS; Text-to-Speech) system.

Among them, a text-to-speech (TTS) system generates speech for an arbitrary sentence using small unit speech and language processing. Using language processing, the input sentence is matched with a combination of appropriate compound units, and the appropriate intonation and duration are extracted from the sentence to determine the prosody of the synthesized sound. Since speech is synthesized by a combination of phonemes and syllables, which are the basic units of language, there is no limitation on the target vocabulary for synthesis, and it is mainly applied to TTS (Text-to-Speech) devices and CTS (Context-to-Speech) devices.

In particular, with the development of artificial intelligence technology, the artificial neural network-based speech synthesis algorithm is showing great performance improvement. In general, a speech synthesis model using an artificial neural network synthesizes speech parameters based on the sentence data analyzed by the artificial neural network replacing the acoustic model part.

Here, it is called End-to-End (E2E) speech recognition technology that learns everything through deep learning without human intervention in the entire process of speech recognition, such as acoustic models, language models, and pronunciation dictionaries.

Until recently, most speech recognition systems use an independent module structure consisting of an acoustic model, a language model, and a pronunciation dictionary. The modular structure has the advantage of being able to explain each role, intuitive, and easy to correct errors. Therefore, many studies have been conducted based on this advantage, and after the development of deep learning technology, research on applying deep learning to each module is in progress.

Although the performance according to this structure has been improved a lot through long research, this independent structure has a disadvantage that complementary functions cannot be expected because each module is learned separately. In addition, errors in each module are propagated to the next module, and in a module that requires human knowledge, such as a pronunciation dictionary, there is a problem that prevents performance improvement due to information that is difficult to input clearly.

Therefore, E2E speech recognition technology is being studied as a method to solve the problem described above, but a method for learning the entire E2E model based on compatibility with each module and a technique for improving the reliability of the output result of the E2E model do not exist yet.

SUMMARY OF THE DISCLOSURE

Technical Objects

Accordingly, the method and apparatus for generating a speech recognition model for generating an E2E speech recognition model using calibration correction according to an embodiment are an invention designed to solve the above-described problems. It aims to provide an E2E speech model with higher reliability and accuracy by generating a E2E speech model reflecting the characteristics of the acoustic model and the language model, respectively.

More specifically, the present invention has a purpose to increase the reliability and accuracy of data output by the E2E speech model by generating an E2E speech model using the correction parameters generated after performing calibration correction on the acoustic model and the language model.

Technical Solution

A speech recognition model generating device for generating an E2E speech recognition model using calibration correction according to an embodiment comprising an acoustic model including a first artificial neural network module using a speech information as input information and using a first text information corresponding to the speech information as output information, a language model comprising a second artificial neural network module using the first text information as input information and outputting a second text information corresponding to the first text information as output information based on the characteristics of the language model, and a E2E speech model generating unit generating a coupling probability distribution based on a first probability distribution information of the acoustic model output by the acoustic model and a second probability distribution information of the language model output by the language model, and generating a E2E speech model based on the coupling probability distribution, wherein the E2E speech model generating unit is generating the E2E speech model based on the corrected acoustic model and the corrected language model after each calibration is performed on the acoustic model and the language model.

The E2E speech model generating unit is generating a first correction parameter by performing calibration on the first probability distribution information, before generating the coupling probability distribution based on the first correction parameter.

The E2E speech model generating unit is generating a second correction parameter by performing calibration on the second probability distribution information, before generating the coupling probability distribution based on the second correction parameter.

The E2E speech model generating unit is generating the first correction parameter by performing calibration on the first probability distribution information based on a first validation set that is reference data corresponding to the first probability distribution information.

The E2E speech model generating unit is generating the second correction parameter by performing calibration on the second probability distribution information based on a second validation set that is reference data corresponding to the second probability distribution information.

The E2E speech model generating unit is performing learning for the acoustic model in a direction to minimize a loss function of the acoustic model based on a first training set (train set) corresponding to the first text information before proceeding with the calibration.

The E2E speech model generating unit is performing learning for the acoustic model in a direction that minimizes the loss function of the acoustic model based on a second training set corresponding to the second text information before proceeding with the calibration.

A method of generating a speech recognition model for generating an E2E speech recognition model using calibration correction according to an embodiment comprising a step of outputting a first probability distribution information of an acoustic model using the acoustic model including a first artificial neural network module using speech information as input information and first text information corresponding to the speech information as output information, a step of outputting second probability distribution information of the language model using a language model comprising a second artificial neural network module using the first text information as input information and outputting a second text information corresponding to the first text information as output information based on the characteristics of the language model, and a step of generating a coupling probability distribution based on the first probability distribution information and the second probability distribution information and generating an end-to-end (E2E) model based on the coupling probability distribution, wherein the step of generating the E2E speech model includes a step of generating the E2E speech model based on the corrected acoustic model and the language model after each calibration is performed on the acoustic model and the language model.

The step of generating the E2E model including: a step of generating a first scaling parameter by performing calibration on the first probability distribution information, and then generating the coupling probability distribution based on the first calibration parameter; and a step of generating a second scaling parameter by performing calibration on the second probability distribution information, and then generating the coupling probability distribution based on the second calibration parameter.

The step of generating the E2E model including: a step of generating the first correction parameter by performing calibration on the first probability distribution information based on a first validation set that is reference data corresponding to the first probability distribution information; and a step of generating the second correction parameter by performing calibration on the second probability distribution information based on a second validation set that is reference data corresponding to the second probability distribution information.

Effects of the Invention

A method and apparatus for generating a speech recognition model for generating an E2E speech recognition model using calibration correction according to an embodiment is possible to learn and derive parameters in a direction that minimizes ECE (Expected Calibration Error) in generating an E2E speech recognition model by combining an acoustic model and a language model, unlike the prior art that finds calibration parameters empirically. Therefore, unlike the prior art, there is an effect of effectively reducing the correction parameter search time for model combining.

In addition, in the case of the prior art, it is difficult to ensure that the correction parameters are optimal parameters because the correction parameters are generated empirically. However, in the case of the present invention, since learning is carried out in a direction to minimize ECE and correction parameters are generated based on this, there is an advantage in that an optimal correction parameter can be generated.

In addition, since the E2E speech recognition model is generated based on the calibration correction, the reliability information output from the generated E2E speech recognition model has an effect of approaching the actual probability.

DETAILED DESCRIPTION OF THE PREFERRED EMBODIMENTS

The configuration shown in the embodiments and drawings described in this specification is only a preferred example of the disclosed invention, and there may be various modifications that can replace the embodiments and drawings of the present specification at the time of filing of the present application.

Throughout the specification, when a part is "connected" with another part, it includes not only the case where it is directly connected, but also the case where it is indirectly connected, and the indirect connection may include being connected via a wireless communication network.

In addition, terms used in the present specification are used only in order to describe embodiments rather than limiting or restricting the present invention. Singular forms are intended to include plural forms unless the context clearly indicates otherwise. In the present specification, it should be understood that the term "include", "comprise", or "have" indicates that a feature, a number, a step, an operation, a constituent element, a part, or a combination thereof described in the specification is present, but does not exclude a possibility of presence or addition of one or more other features, numbers, steps, operations, constituent elements, parts, or combinations, in advance.

In addition, terms including an ordinal number such as "first", "second", etc. used herein may be used to describe various elements, but the elements are not limited by the terms, and the terms are used only for the purpose of distinguishing one component from another. For example, without departing from the scope of the present invention, a first component may be referred to as a second component, and similarly, a second component may also be referred to as a first component.

In addition, terms such as "— part", "— group", "— block", "— member", and "— module" may mean a unit for processing at least one function or operation. For example, the terms may mean at least one process processed by at least one hardware such as a field-programmable gate array (FPGA)/application specific integrated circuit (ASIC), at least one software stored in a memory, or a processor.

The signs attached to each step are used to identify each step, and these signs do not indicate the order between the steps, and each step can be performed differently from the stated order unless the context clearly indicates a specific order.

Hereinafter, an embodiment according to the present invention will be described in detail with reference to the accompanying drawings.

Meanwhile, the title of the invention according to the present specification has been described as 'a method and apparatus for generating a speech recognition model for generating an E2E speech recognition model using calibration correction', but for the convenience of the following description, 'a method and apparatus for generating a speech recognition model for generating an E2E speech recognition model using calibration correction' is abbreviated as 'a method for generating a speech recognition model or an apparatus for generating a speech recognition model'.

Figure 1:
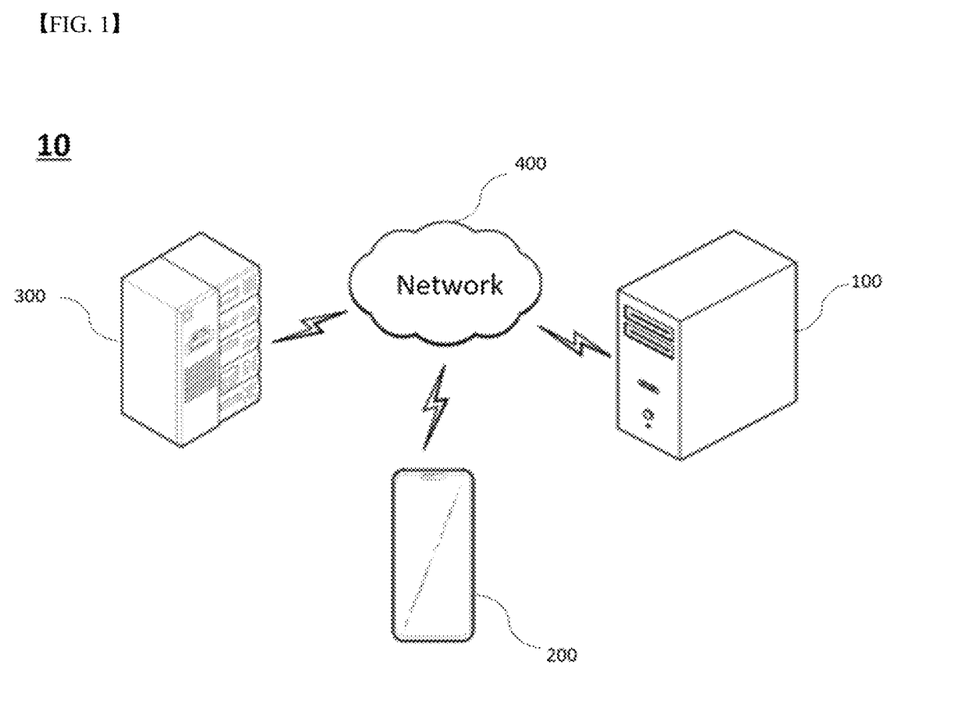
FIG. 1 is a block diagram illustrating some components of a system for generating a speech model according to an embodiment.

FIG. 1 is a block diagram illustrating some components of a system for generating a speech recognition model according to an embodiment.

As shown in FIG. 1, the system 10 for generating a speech recognition model using an artificial neural network may include a speech recognition model generating apparatus 100, a user terminal 200 and a server 300, and each configuration may be communicatively coupled to each other by a network 400.

For example, the speech recognition model generating apparatus 100, the user terminal 200, and the server 300 may be connected to each other in a 5G communication environment, and various electronic devices used in homes or offices in addition to the devices shown in FIG. 1 can be connected and operated under the Internet of Things environment.

The speech recognition model generating apparatus 100 is an apparatus for outputting text information or speech information corresponding to input speech data. The speech recognition model generating apparatus 100 is not only an apparatus for outputting text information, but also apparatuses necessary for performing various artificial intelligence algorithms may be provided, and data necessary for operating an artificial neural network may be stored in that.

The speech recognition model generating apparatus 100 is an apparatus capable of outputting text information or speech information corresponding to the input speech data and learning and inference by the artificial neural network module. Accordingly, the speech recognition model device 100 is a device 100 may be implemented such as a server, a PC, a tablet PC, a smart phone, a smart watch, a smart glass, a wearable device, etc. or a specific application or program.

The user terminal 200 may monitor the state of the speech recognition model generating apparatus 100 through an authentication process after accessing the speech model generating application site or the speech model generating site, and furthermore, the speech recognition model generating apparatus 100 can be driven or controlled by the user terminal 200.

In this embodiment, the user terminal 200 is a desktop computer, a smartphone, a notebook computer, a tablet PC, a smart TV, a mobile phone, a personal digital assistant (PDA), a laptop, a media player, a micro server, a global positioning (GPS) operated by a user. system) devices, e-book terminals, digital broadcast terminals, navigation devices, kiosks, MP3 players, digital cameras, home appliances, and other mobile or non-mobile computing devices, but is not limited thereto.

In addition, the user terminal 200 may be a wearable terminal such as a watch, glasses, a hair band, and a ring having a communication function and a data processing function. The user terminal 200 is not limited to the above, and a terminal capable of web browsing may be borrowed without limitation.

The server 300 may be a big data server required to applying various artificial intelligence algorithms or a database server that provides data for operating speech recognition model generating apparatus 100. In addition, the server 300 may include a web server or an application server that enables remote control of the operation of the speech recognition model generating apparatus 100 using a speech synthesis application or a speech synthesis web browser installed in the user terminal 200.

Here, artificial intelligence (AI) is a field of computer science and information technology that studies how computers can do thinking, learning, and self-development that can be done with human intelligence. Artificial intelligence could enable computers to mimic intelligent human behavior.

Machine learning is a field of artificial intelligence and refers to a field of research that creates the ability to learn on its own without a program on a computer. Specifically, machine learning can be said to be a technology that studies and builds a system for learning based on empirical data, making predictions, and improving its own performance and an algorithm for the system.

Machine learning algorithms may take the approach of building specific models to make predictions or decisions based on input data, rather than executing fixed, static program instructions.

The server 300 may transmit/receive a signal to and from the speech recognition model generating apparatus 100 and/or the user terminal 200.

After receiving the speech data received from the user terminal 200, the server 300 may transmit the received information to the speech recognition model generating apparatus 100.

The network 400 may serve to connect the multi-speaker speech recognition apparatus 100 using an artificial neural network, the user terminal 200, and the server 300. The network 400 may cover, for example, a wired network such as local area networks (LANs), wide area networks (WANs), metropolitan area networks (MANs), integrated service digital networks (ISDNs), or a wireless network such as wireless LANs, CDMA, Bluetooth, and satellite communication, but the scope of the present invention is not limited thereto.

In addition, the network 400 may transmit and receive information using short-distance communication and/or long-distance communication. Here, the short-distance communication may include Bluetooth, radio frequency identification (RFID), infrared data association (IrDA), ultra-wideband (UWB), ZigBee, and wireless fidelity (Wi-Fi) technologies. Long-distance communication may include code division multiple access (CDMA), frequency division multiple access (FDMA), time division multiple access (TDMA), orthogonal frequency division multiple access (OFDMA), single carrier frequency division multiple access (SC-FDMA) technology.

Network 400 may include connections of network elements such as hubs, bridges, routers, switches, and gateways. Network 400 may include one or more connected networks, eg, multiple network environments, including public networks such as the Internet and private networks such as secure enterprise private networks.

Access to network 400 may be via one or more wired or wireless access networks. Furthermore, the network 400 may support an Internet of Things (IoT) network and/or 5G communication that exchanges and processes information between distributed components such as things.

So far, the speech recognition model generation system 10 according to the present invention has been studied. Hereinafter, after examining the principle of generating a speech recognition model according to the prior art and problems of the related art, the configuration and effects of the speech recognition model generating apparatus 100 according to the present invention will be described in detail.

In the present specification, speech recognition aims to find the most appropriate word sequence (W) corresponding to a given speech (X). And when modeling this probabilistically, it can be expressed by Equation (1) below.

$$P(W|X) \sim P(X|W) * P(W) \quad \text{(Equation 1)}$$

The probabilistic speech recognition model estimates the probability of the occurrence of a word string (W) in a given speech (X), and can search for a word string having the highest probability value through a decoding process. And, through the Bayes rule, the posterior probability (P(W|X)) may be expressed as a product of the prior probability (P(W)) and the conditional probability (P(X|W)).

When the speech recognition system is divided into a prior probability part and a conditional probability part, there is an advantage in that it is possible to improve the speech recognition performance of an independently learned language model using unpaired text data. Therefore, many speech recognition systems independently learn P(X|W) and P(W), search the combined probability distribution of the two learned models, and finally output the word sequence with the highest probability.

Artificial neural networks based on deep learning show high classification accuracy (P(X|W)), but due to too much emphasis on reliability, artificial neural networks are often overfitted to training datasets in recent years, and this problem is also occurring in the field of speech recognition.

When an overfitting problem occurs in an artificial neural network, it may adversely affect decoding of a speech recognition system using a coupling probability distribution of independently learned probabilistic models. Hereinafter, it will be described in detail with reference to FIG. 2.

Figure 2:
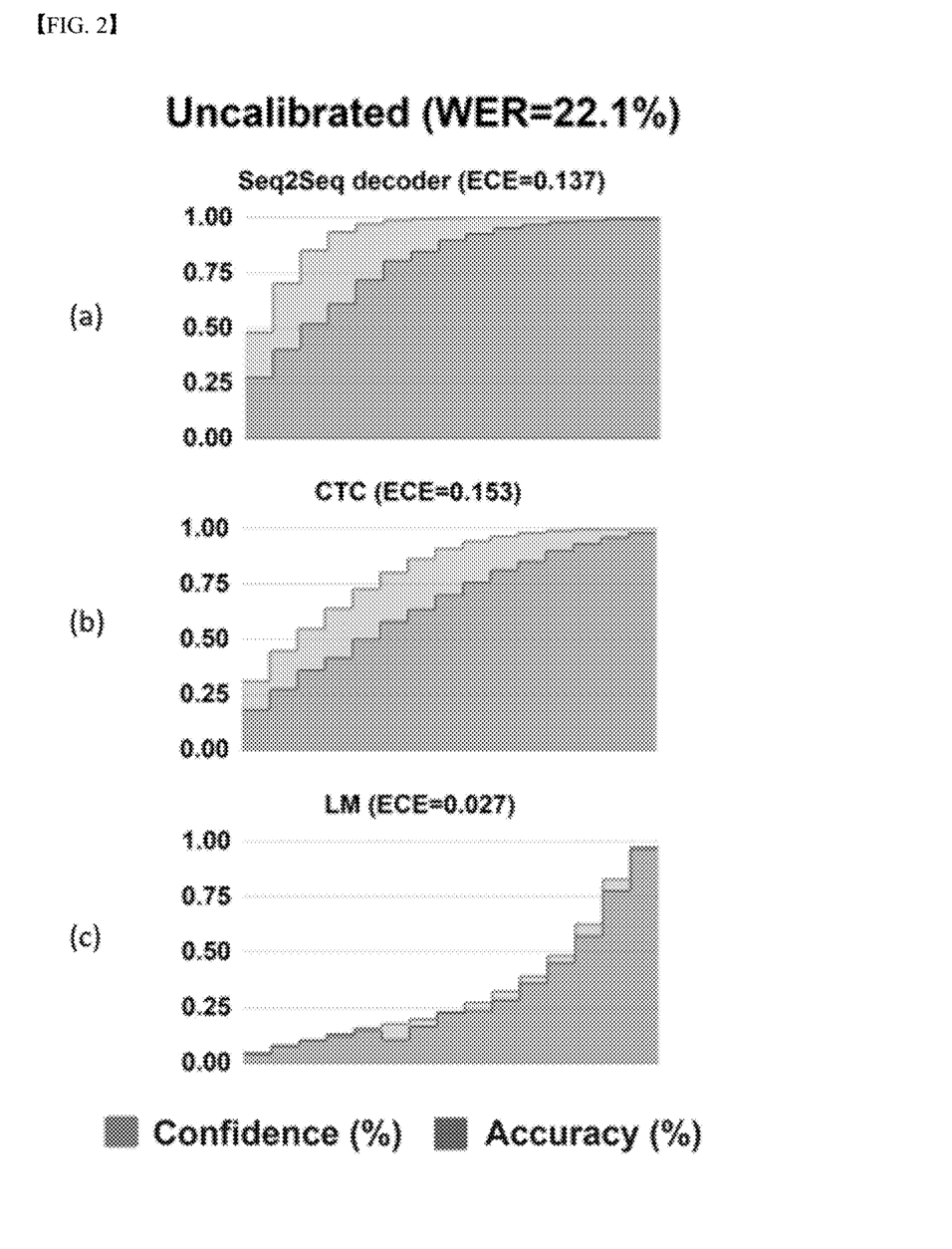
FIG. 2 is a diagram for explaining a problem that occurs when an E2E model is generated according to the prior art.

FIG. 2 is a diagram for explaining a problem that occurs when an E2E model is generated according to the prior art.

Specifically, FIG. 2(*a*) is a diagram illustrating a graph of confidence and accuracy of output information output from an acoustic model according to the prior art, and FIG. 2(*b*) is a diagram illustrating a graph of confidence and accuracy of output information output from a Connectionist Temporal Classification (CTC) acoustic model according to the prior art, FIG. 2(*c*) is a diagram illustrating a graph of confidence and accuracy of output information output from a language model according to the prior art.

In FIG. 2, reliability is output information for the most reliable value among values output from the artificial neural network, and accuracy in FIG. 2 means the probability value of having a certain degree of accuracy when the output information output by each model is compared with information that becomes the actual reference data.

In FIG. 2, the case where the reliability graph (blue) line and the accuracy graph line match is the most ideal graph. In this case, the output information for each model is considered to be the most similar information to the actual model.

However, as shown in FIG. 2, according to the prior art, it can be seen that the accuracy of the reliability information output from each model does not match the actual accuracy, and in particular, it can be seen that the deviation is higher in the acoustic model.

This problem occurs because, as described above, when learning is performed independently for each model, an optimized result is output only for each model. In other words, since the E2E model outputs the final information by linking the acoustic model and the speech model, compatibility between the two models is very important. But there is a problem in that the accuracy of the output result cannot be guaranteed because the models that have been independently trained perform synthesis.

If an E2E speech model is generated by synthesizing an acoustic model and a language model based on the models showing the output result as shown in FIG. 2, since the synthesis was performed using an acoustic model with low reliability and accuracy, there are many differences between the synthesized E2E speech model and the actual E2E speech model.

Looking closely at this, a speech recognition system using an independently learned acoustic model and a language model estimates a word sequence using the combined probability distribution of the acoustic model and the language model. At this time, if a difference of the entropy output by the two models is extremely high, the final probability distribution follows the model distribution with low entropy output compared to the actual performance of the two models. As a result, it can be seen the synthesized model does not finally show high recognition performance just through the accuracy of individual models is improved.

Therefore, the method and apparatus for generating a speech recognition model for generating an E2E speech recognition model using calibration correction according to an embodiment is an invention devised to solve the above-described problems and reflects the characteristics of the acoustic model and the language model, respectively. The purpose is to create an E2E speech model with high reliability and accuracy.

Specifically, the E2E speech recognition model according to the present invention generates a correction parameter that adjusts the entropy output by each model based on the expected calibration error (ECE) of the acoustic model and the language model that are independently learned. The purpose of this is to minimize the gap that occurs in the synthesis of the acoustic model and the language model by generating the coupling probability distribution based on the correction parameters. Such a scaling parameter can be learned through a numerical method, and the speech recognition system learned through the proposed method uses the corrected probability value to correct the coupling probability distribution, so the recognition performance of the speech recognition system can be effectively improved. Hereinafter, the components of the present invention will be described.

Figure 3:
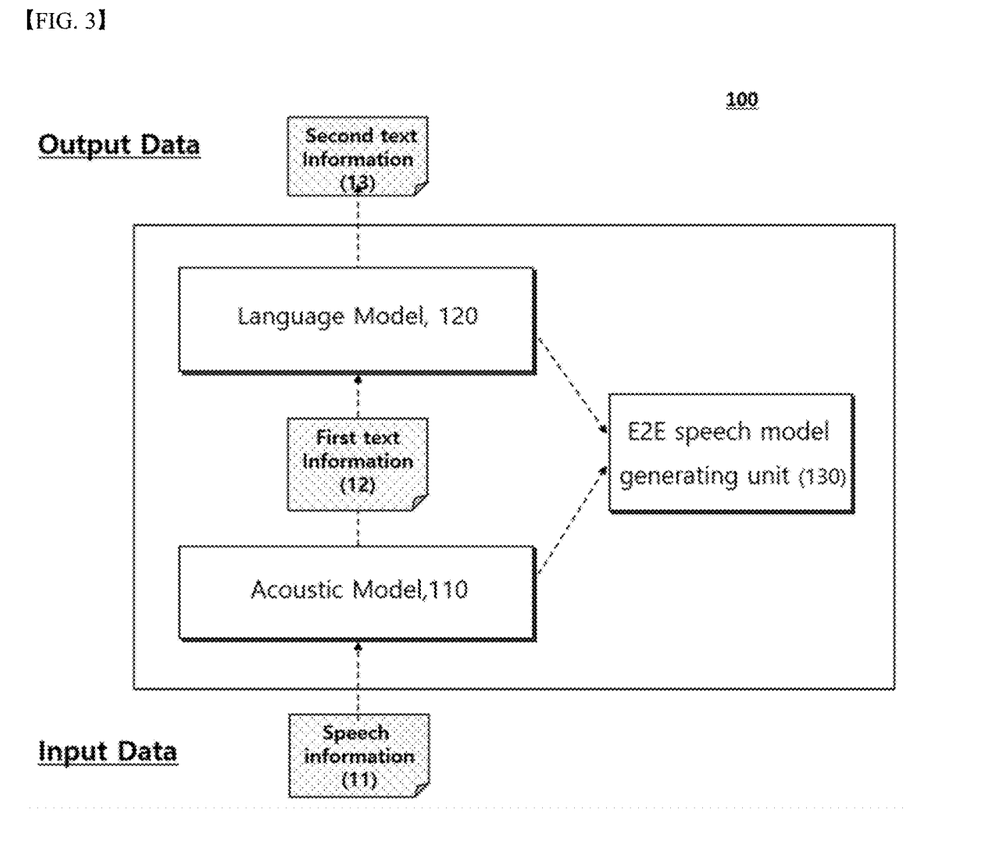
FIG. 3 is a block diagram illustrating some components of a speech recognition model according to an embodiment of the present invention.
Figure 4:
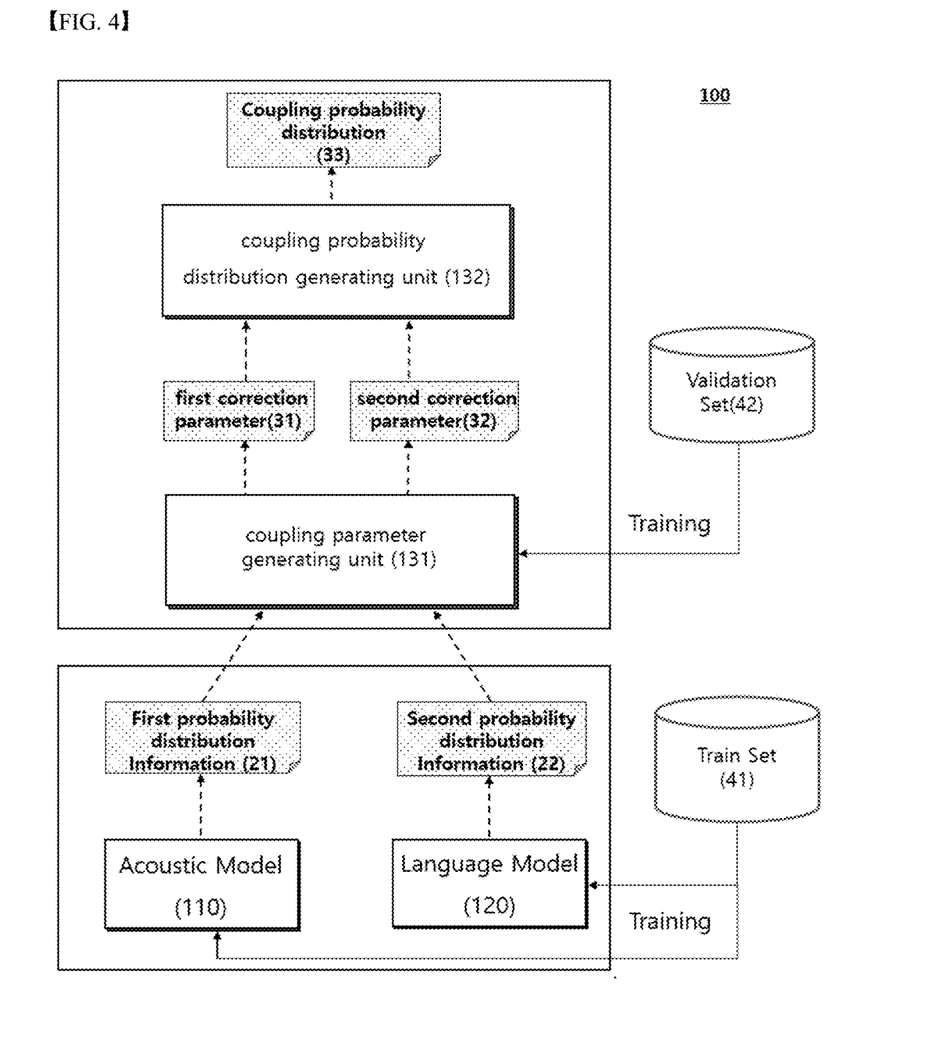
FIG. 4 is a diagram for explaining a method of performing learning by a speech recognition model according to an embodiment of the present invention.

FIG. 3 is a block diagram illustrating some components of a speech recognition model according to an embodiment of the present invention, and FIG. 4 is a diagram for explaining a method for performing learning by a speech recognition model according to an embodiment of the present invention.

FIG. 3 and FIG. 4, the speech recognition model generating apparatus 100 according to an embodiment of the present invention may include an acoustic model 110, a language model 120, E2E speech model generating unit 130 including a coupling parameter generating unit 131, and a coupling probability distribution generating unit 132.

The acoustic model 110 is a model that converts input speech information into text information. Specifically, the acoustic model 110 according to the present invention may include a first artificial neural network module using the speech information 11 as input information and using first text information corresponding to the speech information as output information. Accordingly, although not shown in the drawing, the first artificial neural network module may include an inference session in which output information is output in response to input information and a learning session in which learning is performed based on input information, output information, and reference information. The process of learning the artificial neural network according to the present invention will be described later.

The speech information 11 input to the acoustic model 110 may be a user's speech input in real time or may be a preset speech of a specific speaker.

Since the acoustic model 110 is not the language model 120, the first text information 12 output from the acoustic model 110 is not information reconstructed according to the meaning of the context, but it refers to information purely obtained by converting input speech information in the acoustic model 110 into text information.

The language model 120 is a model for predicting and rearranging languages according to contexts and situations with respect to input text. Specifically, the language model 120 means a model which uses a result of analysis based on a large amount of text to represent a relationship between words currently being input as a probability, then predicts a word with a high probability of appearing after a specific word, and outputs predicted words.

Therefore, the language model can prepare learning data according to the purpose of use and learn based on it. For example, the language model can be trained according to the purpose of use of a language model specialized in financial terms, a language model specialized in legal terms, and a language model specialized in scientific terms. Therefore, the language model may output different results even if the input word is the same according to the type of the learned text data, and the language model 120 according to the present invention may be composed of a language model including the features described above.

The language model 120 may include a second artificial neural network module that uses the first text information 12 output from the acoustic model 110 as input information, and outputs the text information 13 corresponding to the first text information 12 based on the language model learned according to the purpose of the user as output information.

Therefore, although not shown in the drawing, the second artificial neural network module may include an inference session in which output information is output in response to input information, and a learning session in which learning is performed based on input information, output information, and reference information. The process of learning the artificial neural network according to the present invention will be described later.

The E2E speech model generating unit 130 according to the present invention can generate a coupling probability distribution based on the first probability distribution information including probability distribution information on the output information output by the acoustic model 110 and second probability distribution information including the probability distribution information of the output information output by the language model 120, and an end-to-end (E2E) model may be generated based on the generated coupling probability distribution.

Calibration correction refers to correction in which various parameter values of the artificial neural network module are changed so that an output value output by the artificial neural network module reflects the confidence of the actual model.

For example, it is referred to as calibration or calibration correction that correcting the parameter values to the artificial neural network module to output B with a 90% probability when A is input, if the probability of output B as output information for input information A is actually 0.9, as a result analyzing the actual data.

Therefore, the E2E speech model generating unit 130 measures ECE (Expected Calibration Error) for the acoustic model 110 and the language model 120, respectively, and generates a scaling parameter to calculate the entropy of the output in a direction to minimize the measured ECE value. And a coupling probability distribution is generated based on the generated parameter.

Such a scaling parameter can be learned through a numerical method, and the speech recognition system learned through the proposed method uses the corrected probability value to correct the coupling probability distribution, so the recognition performance of the speech recognition system can be effectively improved.

When the training method according to the calibration of the E2E speech model generating unit 130 is described, as shown in FIG. 4, the E2E speech model generating unit 130 generates a first correction parameter by performing calibration on the first probability distribution information based on a first validation set that is reference data corresponding to the first probability distribution information, and the acoustic model may be trained based on the generated first calibration parameter.

In addition, the E2E speech model generating unit 130 generates a second correction parameter by performing calibration on the second probability distribution information based on a second validation set that is reference data corresponding to the second probability distribution information, and the language model 120 may be trained based on the generated second correction parameter.

The E2E speech model generating unit 130 may perform the calibration by softening the softmax function corresponding to the output layer.

Specifically, In the E2E speech model generating unit 130, calibration can be performed by converting a logic vector Z into Equation 2 below using T, which is a single scalar parameter, in a multi-classification problem situation in which K labels are attached.

$$\hat{q}_i = \max_k \sigma_{softmax}(z_i/T)^{(k)} \qquad \text{(Equation 2)}$$

q^ means a calibrated probability, and Equation 2 means performing calibration by dividing a logic vector in a multi-class classification problem with K labels for a single scalar parameter, T.

In Equation 2, when T, which is a single scalar parameter, is 1, it becomes the original expression for obtaining reliability using Softmax. As T increases, the final q converges to 1/K, and as T is close to 0, q gets closer to 1.

In addition, an optimal value of the single scalar parameter T may be determined by learning. Specifically, learning may be performed on a single scalar parameter T using a calibration validation set, which is another validation set having the same characteristics as the validation set of the E2E speech model generating unit 130.

Also, the E2E speech model generating unit 130 may perform learning on a single scalar parameter T such that a negative log likelihood (NLL) value in the calibration validation set is minimized by using the calibration validation set. When calibration is performed in this way, the single scalar parameter T is calibrated without changing the maximum value of the output of the soft max. This method can also be applied to an artificial neural network module. Also, the reliability information of the output information of the speech model generated by the E2E speech model generating unit 130 is closer to the actual probability.

In addition, the E2E speech model generating unit 130 according to the present invention may perform learning on the acoustic model 110 and the language model 120 as shown in FIG. 4 before performing calibration.

The acoustic model 110 may be trained in a direction of minimizing the loss function of the acoustic model based on a first training set corresponding to the first text information 12.

The E2E speech model generating unit 130 may use a difference between the first text information 12 that is output information of the acoustic model 110 and the first reference data corresponding to the first text information 12 in the training data 41 (train set) as a first loss function. In addition, the acoustic model 110 may be trained in a manner that corrects the parameters of the acoustic model 110 in a direction that minimizes the first loss function.

The language model 120 may be trained in a direction of minimizing the loss function of the acoustic model based on a second training set corresponding to the second text information 13.

Specifically, the E2E speech model generating unit 130 define the second loss function as a difference between the second text information 13 that is output information of the language model 120 and the second reference data corresponding to the second text information 13 in the training data 41 (train set). The language model 120 may be trained by correcting the parameters of the language model 120 in a direction that minimizes the second loss function by using the difference from the second reference data corresponding to the second loss function.

Before performing the calibration correction, after performing learning on the acoustic model 110 and the language model 120, and performing calibration correction, the reliability and accuracy of the output diagram of the acoustic model 110 and the language model 120 can be effectively increased at the same time.

Figure 5:
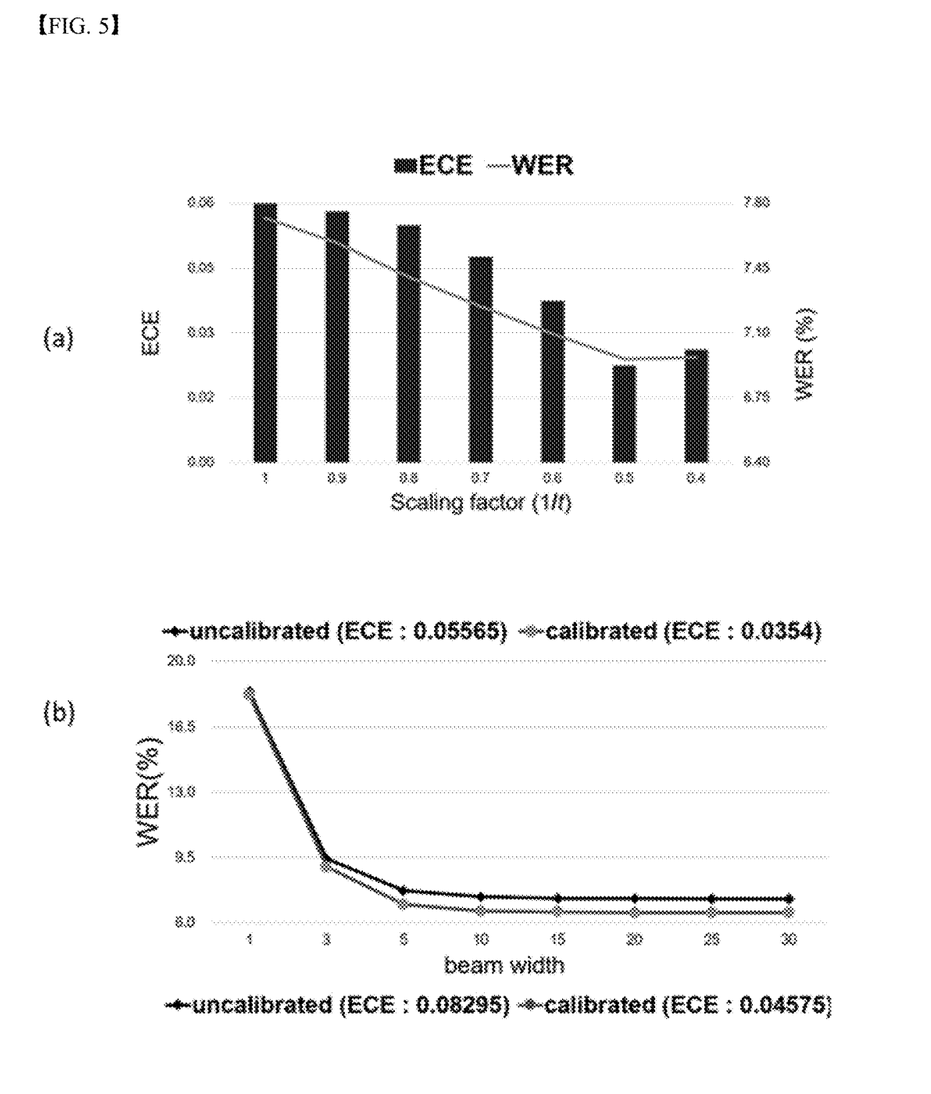
FIG. 5 is a diagram for explaining the effect of the present invention, and FIG. 5 (a) is a graph showing the relationship between calibration and error rate.

FIG. 5 is a view for explaining the effect according to the present invention. FIG. 5 (a) is a graph showing the relationship between calibration and error rate, and FIG. 5 (b) is a graph showing an error rate according to beam width. In FIG. 5, ECE means Expected Calibration Error, and WER means Word Error Rate, which is a word recognition error rate.

Referring to FIG. 5 (a), the ECE decreases as shown when calibration is performed through the correction parameter according to the present invention. Accordingly, in the speech recognition system according to the present invention, the coupling probability distribution approximates the actual probability distribution, and the word error rate (WER) of the speech recognition system is also reduced.

In addition, referring to FIG. 5 (b), in the speech recognition system according to the present invention, the error rate is reduced when the beam width is 2 or more.

Figure 6:
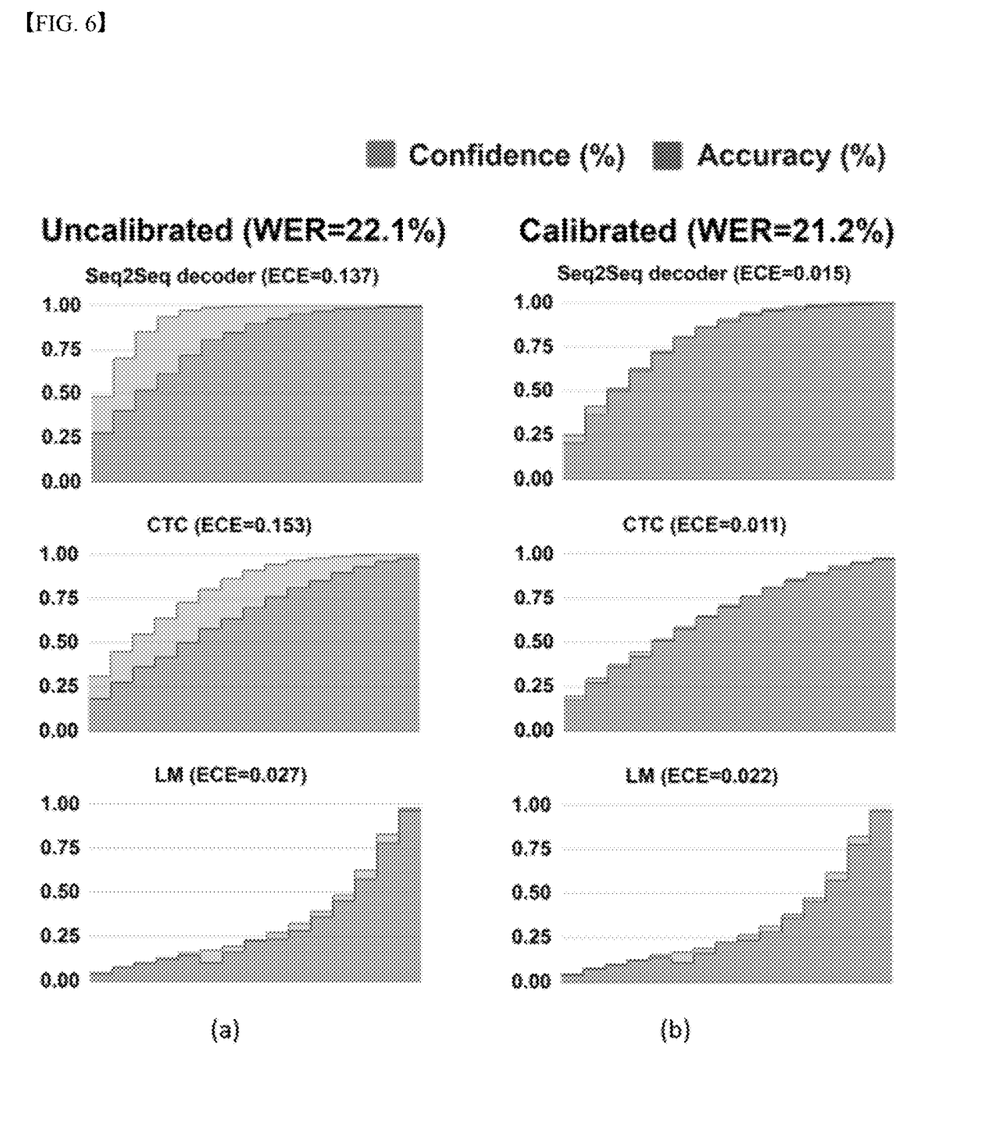
FIG. 6 is a diagram for comparing the speech model according to the prior art and the speech model according to the present invention.

FIG. 6 is a diagram for comparing a speech model according to the prior art and a speech model according to the present invention. FIG. 6 (a) is the same as the graph described in FIG. 2, and FIG. 6 (b) is a graph showing reliability information and accuracy information output from the models according to the present invention.

Meanwhile, in the case of the experiment according to FIG. 6, the experiment was performed by dividing the entire experimental set into 15 bins according to the output reliability of the speech recognition system, and FIG. 6 is a graph comparing reliability information and actual accuracy according to each bin.

Referring to FIG. 6 (a), in the case of FIG. 6(a), as described above, the overconfidence problem that causes the performance of the speech recognition system to deteriorate is visually shown. The overconfidence problem occurs because the output probability value (blue) of the actual speech recognition system is higher than the probability of getting the correct answer (red).

However, in the case of the speech recognition system according to the present invention, as shown in FIG. 6 (b), the red graph and the blue graph are relatively identical to those of FIG. 6 (a). That is, the speech model according to the present invention is a model that outputs information most like information output by the actual speech model than the speech model according to the prior art.

Figure 7:
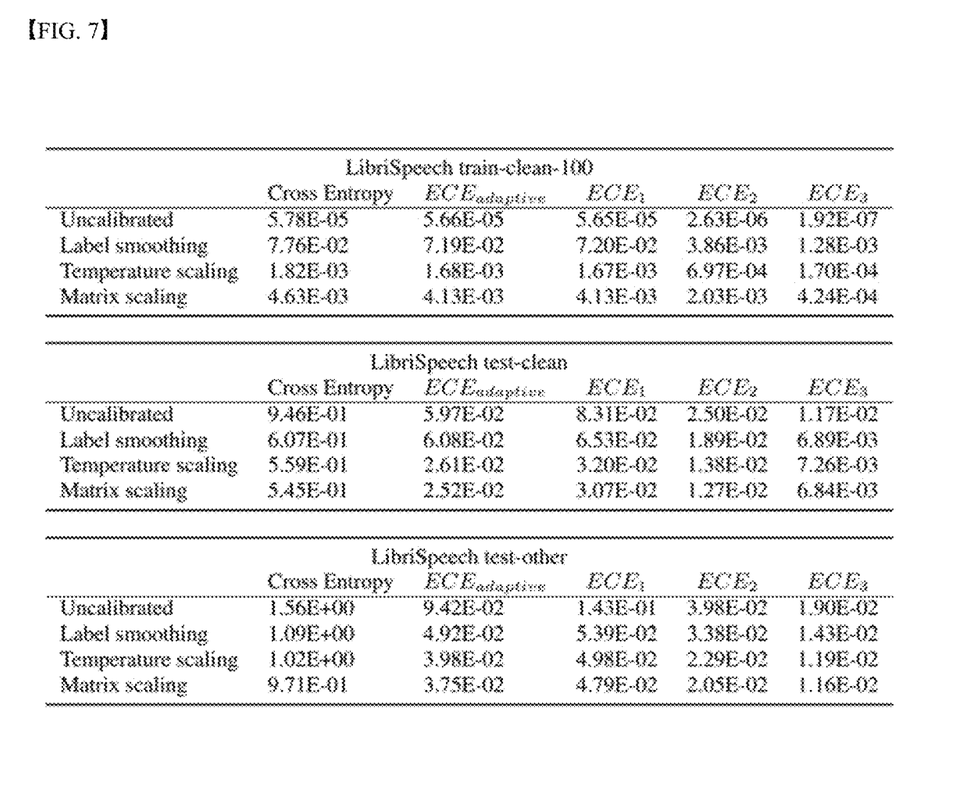
FIG. 7 is a diagram for comparing the performance of the E2E speech model according to the present invention and the E2E speech model according to the prior art.

FIG. 7 is a diagram for comparing the performance of the E2E speech model according to the present invention and the E2E speech model according to the prior art.

In the case of the experiment according to FIG. 7, the Libri Speech dataset, which is an official dataset, was used, and as shown in FIG. 7, it can be confirmed that the method (temperature scaling) proposed according to the present invention effectively lowering the ECE and cross entropy of the speech recognition system with respect to the test set.

Up to now, a method and apparatus for generating a speech recognition model for generating an E2E speech recognition model using calibration correction according to the present invention have been described in detail through the drawings.

A method and apparatus for generating a speech recognition model for generating an E2E speech recognition model using calibration correction according to an embodiment is possible to learn and derive parameters in a direction that minimizes ECE (Expected Calibration Error) in generating an E2E speech recognition model by combining an acoustic model and a language model, unlike the prior art that finds calibration parameters empirically. Therefore, unlike the prior art, there is an effect of effectively reducing the correction parameter search time for model combining.

In addition, in the case of the prior art, it is difficult to ensure that the correction parameters are optimal parameters because the correction parameters are generated empirically. However, in the case of the present invention, since learning is carried out in a direction to minimize ECE and correction parameters are generated based on this, there is an advantage in that an optimal correction parameter can be generated.

In addition, since the E2E speech recognition model is generated based on the calibration correction, the reliability information output from the generated E2E speech recognition model has an effect of approaching the actual probability.

The device described above may be implemented as a hardware component, a software component, and/or a combination of the hardware component and the software component. For example, devices and components described in the embodiments may include, for example, a processor, a controller, an arithmetic logic unit (ALU), a digital signal processor, a microcomputer, a field programmable array (FPA), a programmable logic unit (PLU), microprocessor, or any other device capable of executing and responding to instructions by using one or more general purpose computers or special purpose computers.

The processing device may execute an operating system (OS) and one or more software applications running on the operating system. The processing device may also access, store, manipulate, process, and generate data in response to execution of the software. For convenience of understanding, although one processing device is sometimes described as being used, one of ordinary skill in the art will recognize that the processing device includes a plurality of processing elements and/or a plurality of types of processing elements. For example, the processing device may include a plurality of processors or one processor and one controller, and other processing configurations are possible, such as parallel processors.

Software may comprise a computer program, code, instructions, or a combination of one or more of these, and may be configured or independently or collectively instruct the processing device to operate as desired. The software and/or data may be embodied in any kind of machine, component, physical device, virtual equipment, computer storage medium or device, to be interpreted by or to provide instructions or data to the processing device. The software may be distributed over networked computer systems and stored or executed in a distributed manner. Software and data may be stored in one or more computer-readable recording media.

The method according to the embodiment may be implemented in the form of program instructions that can be executed through various computer means and recorded in a computer-readable medium. The computer-readable medium may include program instructions, data files, data structures, etc. alone or in combination. The program instructions recorded on the medium may be specially designed and configured for the embodiment or may be known and available to those skilled in the art of computer software. Examples of the computer-readable recording medium include magnetic media such as hard disks, floppy disks and magnetic tapes, optical media such as CD-ROMs and DVDs, and magnetic such as floppy disks. —includes magneto-optical media, and hardware devices specially configured to store and execute program instructions, such as ROM, RAM, flash memory, and the like. Examples of program instructions include not only machine language codes such as those generated by a compiler, but also high-level language codes that can be executed by a computer using an interpreter or the like.

As described above, although the embodiments have been described with reference to the limited embodiments and drawings, various modifications and variations are possible from the above description by those skilled in the art. For example, the described techniques are performed in an order different from the described method, and/or the described components of the system, structure, apparatus, circuit, etc. are combined or combined in a different form than the described method, or other components or substituted or substituted by equivalents may achieve an appropriate result. Therefore, other implementations, other embodiments, and equivalents to the claims are also within the scope of the following claims.

The invention claimed is:

1. A speech recognition model generating device for generating an end-to-end (E2E) speech recognition model using calibration correction comprising:
an acoustic model including a first artificial neural network module using a speech information as input information and using a first text information corresponding to the speech information as output information,
a language model comprising a second artificial neural network module using the first text information as input information and outputting a second text information corresponding to the first text information as output information based on characteristics of the language model, and
a processor configured to generate a coupling probability distribution based on a first probability distribution information of an acoustic model output by the acoustic model and a second probability distribution information of a language model output by the language model, and generating the E2E speech recognition model based on the coupling probability distribution,
wherein the processor is further configured to generate the E2E speech recognition model based a corrected acoustic model and a corrected language model after each calibration is performed on the acoustic model and the language model.

2. The speech recognition model generating device for generating the E2E speech recognition model using calibration correction of claim 1, wherein the processor is further configured to generate a first correction parameter by performing calibration on the first probability distribution information, before generating the coupling probability distribution based on the first correction parameter.

3. The speech recognition model generating device for generating the E2E speech recognition model using calibration correction of claim 2,
wherein the processor is further configured to generate the first correction parameter by performing calibration on the first probability distribution information based on a first validation set that is reference data corresponding to the first probability distribution information.

4. The speech recognition model generating device for generating the E2E speech recognition model using calibration correction of claim 1,
wherein the processor is further configured to generate a second correction parameter by performing calibration on the second probability distribution information, before generating the coupling probability distribution based on the second correction parameter.

5. The speech recognition model generating device for generating the E2E speech recognition model using calibration correction of claim 4,
wherein the processor is further configured to generate the second correction parameter by performing calibration on the second probability distribution information based on a second validation set that is reference data corresponding to the second probability distribution information.

6. The speech recognition model generating device for generating the E2E speech recognition model using calibration correction of claim 1,
wherein the processor is further configured to perform learning for the acoustic model in a direction to minimize a loss function of the acoustic model based on a first training set (train set) corresponding to the first text information before proceeding with the calibration.

7. The speech recognition model generating device for generating the E2E speech recognition model using calibration correction of claim 6,
wherein the processor is further configured to perform learning for the acoustic model in a direction that minimizes the loss function of the acoustic model based on a second training set corresponding to the second text information before proceeding with the calibration.

8. A method of generating a speech recognition model for generating an end-to-end (E2E) speech recognition model using calibration correction comprising:
a step of outputting a first probability distribution information of an acoustic model using the acoustic model including a first artificial neural network module using speech information as input information and first text information corresponding to the speech information as output information,
a step of outputting a second probability distribution information of a language model using the language model comprising a second artificial neural network module using the first text information as input information and outputting a second text information corresponding to the first text information as output information based on a characteristics of the language model, and
a step of generating a coupling probability distribution based on the first probability distribution information and the second probability distribution information and generating the E2E speech recognition model based on the coupling probability distribution,
wherein the step of generating the E2E speech recognition model includes:
a step of generating the E2E speech recognition model based on a corrected acoustic model and the language model after each calibration is performed on the acoustic model and the language model.

9. The method of generating the speech recognition model for generating the E2E speech recognition model using calibration correction of claim 8,
wherein the step of generating the E2E speech recognition model includes:
a step of generating a first scaling parameter by performing calibration on the first probability distribution information, and then generating the coupling probability distribution based on the first calibration parameter; and
a step of generating a second scaling parameter by performing calibration on the second probability distribution information, and then generating the coupling probability distribution based on the second calibration parameter.

10. The method of generating the speech recognition model for generating the E2E speech recognition model using calibration correction of claim 9,
wherein the step of generating the E2E speech recognition model includes:
a step of generating a first correction parameter by performing calibration on the first probability distribution information based on a first validation set that is reference data corresponding to the first probability distribution information; and
a step of generating a second correction parameter by performing calibration on the second probability distribution information based on a second validation set that is reference data corresponding to the second probability distribution information.

* * * * *